(12) United States Patent
Baskette et al.

(10) Patent No.: US 11,830,006 B2
(45) Date of Patent: *Nov. 28, 2023

(54) MOBILE PAYMENT FRAUDULENT DEVICE LIST

(71) Applicant: JPMorgan Chase Bank, N.A., New York, NY (US)

(72) Inventors: Kurt A Baskette, Katy, TX (US); John D Moore, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,326

(22) Filed: Jun. 28, 2022

(65) Prior Publication Data

US 2022/0327543 A1 Oct. 13, 2022

Related U.S. Application Data

(62) Division of application No. 16/418,014, filed on May 21, 2019, now Pat. No. 11,403,640.

(51) Int. Cl.
*G06Q 40/00* (2023.01)
*G06Q 20/40* (2012.01)
*G06Q 20/36* (2012.01)
*H04L 9/40* (2022.01)

(52) U.S. Cl.
CPC ......... *G06Q 20/4016* (2013.01); *G06Q 20/36* (2013.01); *H04L 63/1483* (2013.01)

(58) Field of Classification Search
CPC .. G06Q 20/4016; G06Q 20/36; G06Q 20/363; H04L 63/0783; H04W 12/71

USPC ............ 705/41, 40, 35, 39, 38, 26; 235/375, 235/380; 726/9, 26

See application file for complete search history.

(56) References Cited

U.S. PATENT DOCUMENTS

| | | | | |
|---|---|---|---|---|
| 9,681,305 | B2* | 6/2017 | Colegate | G06Q 20/4016 |
| 9,794,074 | B2* | 10/2017 | Toll | G06F 21/602 |
| 9,853,977 | B1* | 12/2017 | Laucius | H04L 63/0815 |
| 11,250,422 | B1* | 2/2022 | Hayes | G06Q 20/3829 |
| 11,263,603 | B1* | 3/2022 | Dhodapkar | G06Q 20/108 |
| 11,282,130 | B2* | 3/2022 | Dixit | G06Q 10/0831 |

(Continued)

OTHER PUBLICATIONS

On designing a flexible e-payment system with fraud detection capability; Proceedings. IEEE International Conference on e-Commerce Technology, 2004. CEC 2004. (pp. 236-243); A. Leung, Zhuang Yan, S. Fong; Jan. 1, 2004. (Year: 2004).*

(Continued)

*Primary Examiner* — Tien C Nguyen
(74) *Attorney, Agent, or Firm* — GREENBLUM & BERNSTEIN, P.L.C.

(57) ABSTRACT

Systems and methods for identifying malicious digital wallet devices are provided. Exemplary embodiments may establish communication with a user device associated with a digital wallet application and determine a unique device identifier for the device. Risk data may then be obtained from one or more fraudulent activity databases and associated with the device identifier. The user device may then be identified as a malicious or non-malicious device based on a device score generated based on the risk data. Devices identified as malicious may then have their unique device identifier stored on a malicious device database.

20 Claims, 2 Drawing Sheets

(56) References Cited

U.S. PATENT DOCUMENTS

| | | | |
|---|---|---|---|
| 11,282,139 B1* | 3/2022 | Winklevoss | G06Q 40/04 |
| 2015/0032627 A1* | 1/2015 | Dill | G06Q 20/40 |
| | | | 705/44 |
| 2015/0046338 A1* | 2/2015 | Laxminarayanan | |
| | | | G06Q 20/38215 |
| | | | 705/67 |
| 2015/0227934 A1* | 8/2015 | Chauhan | G06Q 20/3224 |
| | | | 705/44 |
| 2015/0356555 A1* | 12/2015 | Pennanen | G06Q 20/4014 |
| | | | 705/71 |
| 2016/0125040 A1* | 5/2016 | Kheterpal | G06Q 20/06 |
| | | | 707/776 |
| 2017/0005804 A1* | 1/2017 | Zinder | H04L 9/3239 |
| 2017/0091750 A1* | 3/2017 | Maim | H04L 9/14 |
| 2018/0068309 A1* | 3/2018 | Mahaffey | G06Q 20/20 |

OTHER PUBLICATIONS

A Method of Fraud & Intrusion Detection for E-payment Systems in Mobile e-Commerce; 2007 IEEE International Performance, Computing, and Communications Conference (pp. 395-401); Pallapa Venkataram, B.Sathish Babu, G.H. Samyama Gungal, M.K Naveen, Apr. 11, 2007. (Year: 2007).*

Leveraging COBIT5 in NFC-based payment technology: challenges and opportunities for security risk mitigation and audit; 2015 First Conference on Mobile and Secure Services (Mobisecserv) (pp. 1-6); Tebug Mba Techoro, Sergey Butakov, Shaun Aghili; Ron Ruhl; Feb. 20, 2015.

Wallet App Credibility Analysis Based on App Content and User Reaction; 2018 5th International Symposium on Emerging Trends and Technologies in Libraries and Information Services (ETTLIS) (pp. 263-268); Anuja Arora, Rishabh Malhotra, Naincy Saxena, Swati Sharma; Feb. 21, 2018.

* cited by examiner

MOBILE PAYMENT FRAUDULENT DEVICE LIST

CROSS-REFERENCE TO RELATED APPLICATION

This is a Division of U.S. application Ser. No. 16/418,014, filed May 21, 2019, the disclosure of which is hereby incorporated by reference in its entirety.

TECHNICAL FIELD

The present disclosure relates generally to identifying and managing fraudulent devices in a digital wallet ecosystem.

BACKGROUND

As the world grows increasingly reliant on transactions involving digital payments, consumers have increasingly relied on the flexibility of digital wallets in making purchases. Digital wallets such as Apple Pay, Google Pay, and the like, allow customers to conduct digital transactions at a point of sale or transfer funds person-to-person using their mobile device. Digital wallets have become a powerful tool in enabling users to make payments and transfer funds without the hassle of carrying a physical wallet or credit card. Additionally, digital wallets have an advantage over traditional card-based transactions in that the user never loses possession of the payment article, preventing a malicious actor from stealing the information and/or using the card to conduct unauthorized purchases.

However, with the increased use of digital wallets has come an increase in the sophistication of malicious actors seeking to commit fraudulent transactions using digital wallet systems. These malicious actors can perpetuate fraudulent transactions against businesses or other consumers using legitimate account information that has been fraudulently obtained and/or perpetuate the creation of fraudulent accounts. When one set of stolen account information is realized as fraudulent and shut down, a malicious actor can just upload a new set of stolen account information in the same digital wallet or using the same digital device. Account or payment providers may easily ban an account associated with fraudulent activity, but often lack the ability to ban the digital wallet or device used in connection with that account. What's more, while these malicious actors may be banned by one payment provider, they may still be able to perpetuate further fraud against another provider. The losses from this type of fraud can place a significant burden and liability on the consumer and the payment entities. The various payment entities and digital wallet providers lack coordinated resources for managing risks and preventing the losses from fraud across the entire digital wallet ecosystem.

There is therefore a need for systems and methods for identifying and managing known fraudulent devices in a digital wallet ecosystem.

SUMMARY

In an exemplary embodiment, a method for identifying malicious wallet devices is provided. The method comprises: communicating with a user device associated with a digital wallet application; determining a unique device identifier for the user device; receiving risk data from at least one fraudulent activity database; associating the device identifier with risk data and generating a device score based on the risk data; and, identifying the user device as a malicious digital wallet device based on the device score.

In another exemplary embodiment, a system for identifying malicious digital wallet devices is provided. The system comprises: a malicious device identification engine configured to: communicate with a user device associated with a digital wallet application; determine a unique device identifier for the user device; receive risk data from a fraudulent activity database; associate the device identifier with the risk data and generate a device score based on the risk data; and, identify the user device as a malicious digital wallet device based on the device score.

In yet another exemplary embodiment, a method for facilitating a transaction involving a digital wallet application is provided. The method comprising: receiving a transaction request from a user device associated with a digital wallet application; determining a unique device identifier for the user device; receiving risk data from at least one fraudulent activity database; associating the device identifier with risk data and generating a device score based on the risk data; and, determining if the user device is a malicious digital wallet device based on the device score, wherein if the user device is malicious, the user device is added to a malicious device database and if the user device is non-malicious, completing the transaction request.

These and other objects, features and advantages of the present invention will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Many digital wallets are designed to replace physical wallets through digital representations of a user's physical payment articles, e.g. credit or debit cards. Access to funds for issuing digital payments and transferring funds via digital wallets is conducted via provisioning of a credit account linked to one or more credit cards. In some digital payment applications, a digital wallet may be linked to a bank account in order to initiate a digital transfer of funds to another party. In some situations, the other party is a business or merchant with a digital payment terminal configured to accept payment via a digital wallet. The user of the digital wallet can transfer funds to the payment terminal using contactless payment technology such as near field communication (NFC) or radio frequency identification (RFID). In other situations, a user of digital wallet may transmit funds to another user using the same or similar payment application. Malicious actors may gain access to legitimate accounts through various forms of fraud and then seek to use this information in conjunction with digital wallet applications. Because digital wallet applications eliminate the need for a physical payment article, malicious actors can set up a digital wallet payment account using only stolen account information. They may then use this stolen information across different digital wallet applications to improve their chances of not being detected. In some situations, a digital wallet may use a tokenization method to avoid using an actual credit card number to process a transaction. In the case of a fraudulent or stolen credit card, the wallet obscures this information and may allow the malicious party to conduct fraudulent activity more easily. Improved systems of tracking malicious actors and the devices that they use to perpetuate this type of fraud is important.

Figure 1:
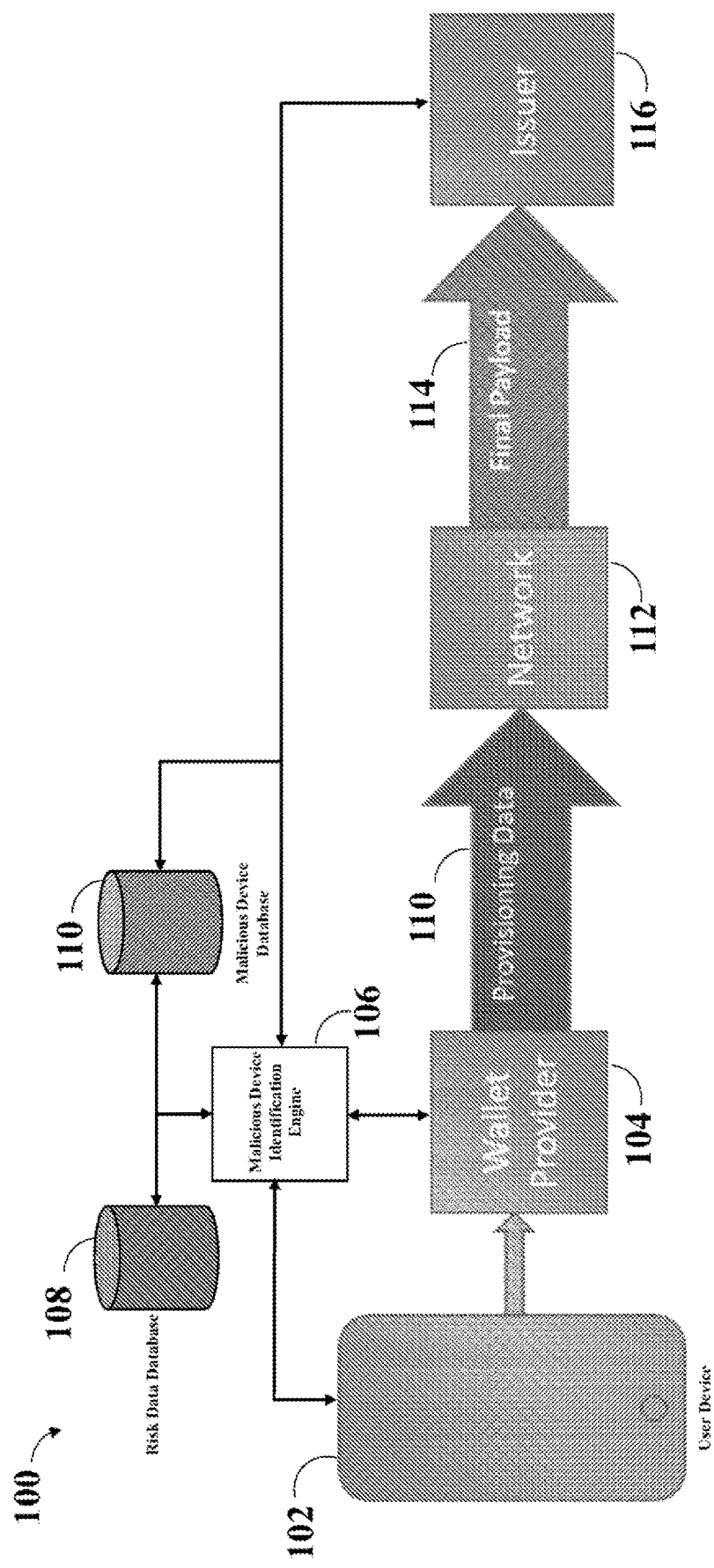
FIG. 1 shows an exemplary system for identifying malicious digital wallet devices.

By the teachings of the present application, an improved system for identifying malicious digital wallet devices is provided. FIG. 1 shows an exemplary malicious wallet device identification system 100. The system 100 comprises at least a user device 102 configured to operate a digital wallet application. User device 102 may be a smart phone, tablet, smart watch, or similar computing device that may be used to conduct transactions using a digital wallet. It will be appreciated by those of skill in the art that user device 102 comprises at least one processor in communication with a memory operable to execute instructions to implement or perform the systems and methods described herein. The digital wallet of user device 102 is configured to communicate with a wallet provider 104.

Wallet provider 104 may be any digital wallet available for download on commercially available application stores. In some embodiments, the wallet provider 104 is the manufacturer of the user device 102. User device 102 may be configured to process digital transactions utilizing a digital wallet application available from wallet provider 104. The digital wallet may allow the user device 102 to be associated with one or more credit cards, debit cards, pre-paid charge cards, bank accounts, savings accounts, or the like. To conduct a transaction using a digital wallet an account must be provisioned with wallet provider 104 on the user device 102. The wallet provider 104 may transmit provisioning data 110 to a credit card network 112. Provisioning data 110 may include information relating to the user device 102 and/or or the various payment accounts associated with the user device 102 and wallet provider 104. Network 112 may be any large scale payment processing network, such as, for example, Visa, Mastercard, etc. Once the network 112 receives provisioning data 110 it may transmit the provisioning data to a credit card issuer, e.g. issuer 116, to complete the provisioning of the account information with the wallet provider 104. The final payload 114 may include similar information as provisioning data 110 and/or may be modified by the network 112 to include data elements based on agreements between the network 112 and the issuer 116 and/or the wallet provider 104.

When user device 102 initiates a digital wallet provisioning event via the wallet provider 104, a malicious device identification engine 106 may establish a communication link with the user device 102 and/or the wallet provider 104. The malicious device identification engine 106 may be configured to access and/or determine various information relating to the user device 102, the wallet provider 104, and/or their association with one another. One such type of information is a device ID or hardware ID which is a unique identifier associated with the physical hardware used in the user device 102. Hardware IDs may include information related to the manufacturer, model number, serial number, etc. of the user device 102. Hardware are often difficult or impossible to alter, and therefore are beneficial for identifying a user device perpetuating fraudulent digital wallet activity. It will be appreciated that additional identifying information relating to the user device 102 may be utilized as a unique identifier.

Once a unique identifier associated with the user device 102 has been determined by the malicious device identification engine 106, the malicious device identification engine 106 may access risk data associated with a device. Risk data associated with a device may be based on data from a fraudulent activity database such as risk data database 108, malicious device database 110, and/or other risk sources. Risk data database 108 may comprise data related to determining a risk level associated with a transaction, user, and/or device, e.g. devices that have been associated with prior fraudulent activity. In some embodiments, the risk data may be correlated to transaction information related to a transaction request. For example, risk database 108 may comprise a list of characteristics that make a transaction more risk-prone, such as, but not limited to, transactions of a high dollar amount, many transactions over a short period of time, transactions involving foreign payments, etc. Risk database 108 may also comprise risk information related to a particular user or user account, e.g. information related to recent changes to the account that are suspicious. Recent changes to a user's address or phone number may recognized as risk factors indicating that a particular account has been comprised by a malicious actor.

The malicious device identification engine 106 may also access a malicious device database 110 which comprises information relating to devices that have been confirmed as being associated with one or more malicious or fraudulent transactions. The malicious device database 110 may use a unique device identifier to identify a malicious device. The malicious device database 110 may be centralized and utilized across different wallet providers. Due to the centralized nature of the malicious device database 110 it may be network and/or issuer agnostic, which decreases the likelihood that a malicious actor could perpetuate fraud even after being identified simply by changing credit issuers or credit networks.

In some embodiments, malicious device identification engine 106 may identify a user device 102 as a malicious device according to a device score. A device score may be generated by the malicious device identification engine 106 and, for example, may be either a 0 or a 1 (where 0 is a non-malicious device, and 1 is a malicious device), or, in certain embodiments, may be a determined according to a variable threshold. Where a threshold for identifying a device as malicious is employed, the threshold may vary according to various factors, such as those associated with risk data at the risk data database 108, or other factors. Identification of a user device as malicious may be made according to risk data received from the risk data database 108, the malicious device list 110, or a combination of the two. In some embodiments, a device score associated with user device 102 is permanent and may not be modified. In some embodiments, the device score associated with user device 102 may aggregate potential malicious activity. For example, if a user device 102 has been associated with two suspicious or potentially malicious activities, its device score may not correspond with a malicious device. However, if the same user device 102 is associated with a third suspicious or potentially malicious activity, the device score will determine the device is malicious. In other embodiments, the device score may be considered sufficient to provision upon receipt of additional information, e.g. two-factor authentication or similar additional verification.

Once identified as malicious, user device 102 may be added to the malicious device database 110 and made identifiable by a unique device identifier, e.g. a hardware ID associated with user device 102. In certain embodiments, once user device 102 has been identified as malicious, wallet provider 104, issuer 116 and/or network 112 may be notified that the particular device has been identified as malicious. In certain embodiments, malicious device identification engine 106 is configured to generate and transmit a notification indicating that a user device 102 has been associated with fraudulent activity and been identified as a malicious device. If during the course of a transaction, a user device 102 is identified as a malicious device, the user device 102 will be disallowed to provision and the attempted transaction will not be processed. In certain embodiments, issuer 116 is notified by the malicious device identification engine that user device 102 has been determined to be a malicious device. In certain embodiments, a device that has been identified as suspicious may be placed on the malicious device database 110 for a temporary period, e.g. 48 hours, in order for more scrutiny to be applied to the activity associated with the user device.

In some embodiments, information relating to the user device 102, such as the device score determined by the malicious device identification engine 106, may be transmitted through existing channels associated with processing of digital wallet transactions. For example, information such as the device score, device type, hardware ID, customer account information, device location, etc., may be transmitted from the wallet provider 104 to a credit card network 112 via provisioning data 110. In some embodiments, this information may be transmitted from the network 112 to the issuer 116 via final payload 114. In certain embodiments, issuer 116 may access the malicious device identification engine 106 and/or the malicious device database 110 to add or modify devices that the issuer 116 becomes aware are associated with malicious activity.

Figure 2:
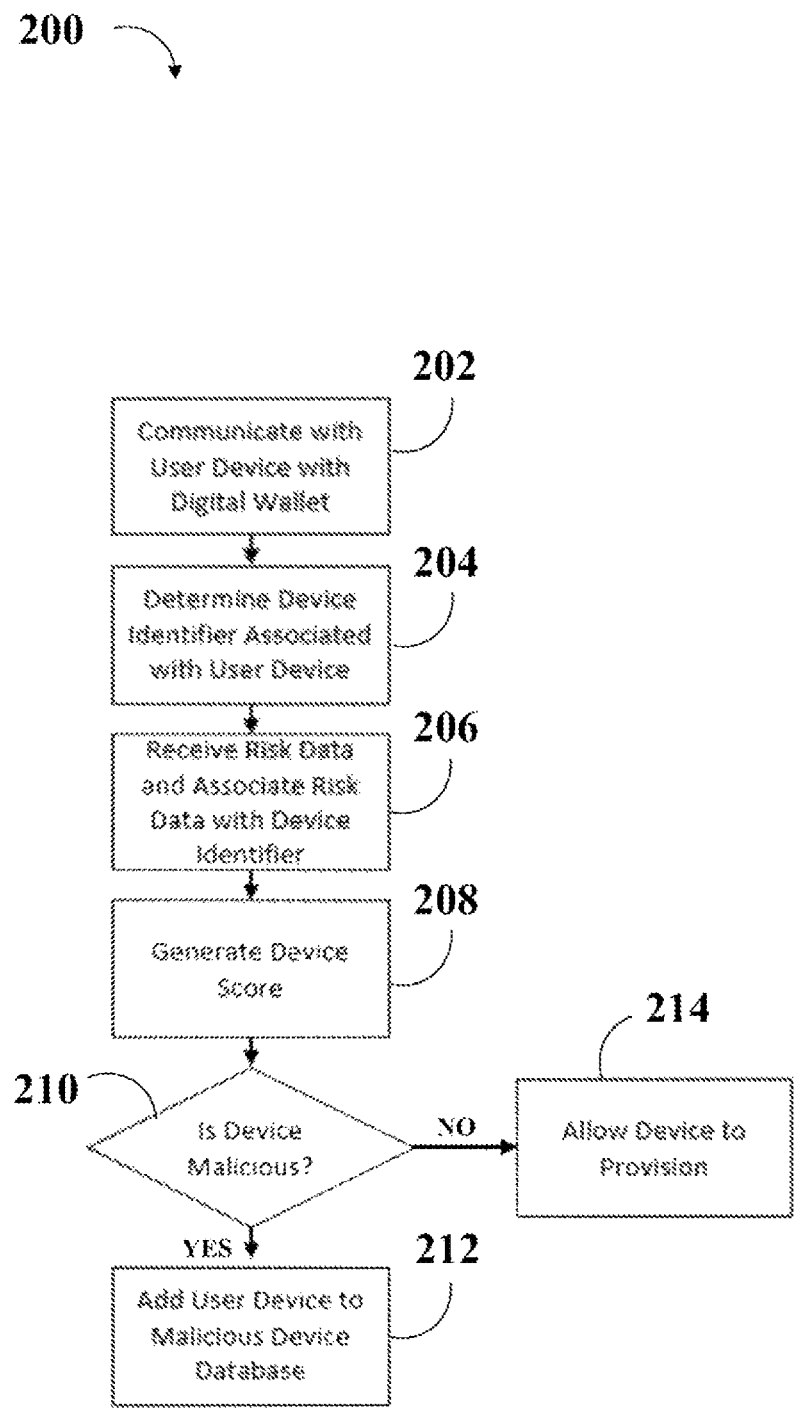
FIG. 2 shows an exemplary method for identifying malicious digital wallet devices.

FIG. 2 illustrates a flow chart of an exemplary method 200 for identifying malicious digital wallet devices. It will be appreciated that the illustrated method 200 and associated steps may be performed in a different order, with illustrated steps omitted, with additional steps added, or with a combination of reordered, combined, omitted, or additional steps.

At step 202, a communication is established with a user device associated with a digital wallet, e.g. by malicious device identification engine 106. In some embodiments, the communication may be established automatically in response to receiving a transaction request from a digital wallet application associated with the user device. At step 204, a unique device identifier associated with the user device may be determined. At step 206, risk data may be received and associated with the device identifier. In certain embodiments, the risk data may be associated with additional identification information related to the user device. At step 208, a device score may be generated based on the risk data. At step 210, a user device may be determined to be a malicious digital wallet device. In some embodiments, this determination is made using the device score associated with the user device. If the user device is identified as malicious, at step 212 the user device may be added to the malicious device database, e.g. malicious device database 110. If the device is not identified malicious at step 210, the device may be allowed to provision, enabling the device to complete one more transactions.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A method for facilitating a transaction involving a digital wallet application, the method comprising:
    receiving a transaction request from a user device associated with a digital wallet application;
    in response to receiving the transaction request, automatically establishing a communication between the user device and a malicious device identification engine;
    determining, by the malicious device identification engine, a unique device identifier for the user device;
    receiving, by the malicious device identification engine, risk data from at least one fraudulent activity database;
    associating, by the malicious device identification engine, the device identifier with risk data and generating a device score based on the risk data;
    determining, by the malicious device identification engine, that the user device is a malicious digital wallet device based on the device score; and
    in response to determining the user device as the malicious digital wallet device, determining that the digital wallet application is turned off or is running in the background on the user device, generating a notification, transmitting an activation control signal to the user device to cause the digital wallet application to display the notification relating to the determined malicious digital wallet device and enable connection via a network with a wallet provider, and
    wherein when the user device is determined to be malicious, the user device is added to the at least one fraudulent activity database and when the user device is determined to be non-malicious, completing the transaction request.

2. The method according to claim 1, wherein the unique device identifier is determined based on a hardware component of the user device.

3. The method according to claim 1, further comprising provisioning the transaction request by transmitting provisioning data to a credit card network.

4. The method according to claim 3, further comprising transmitting a final payload to a credit card issuer, wherein the credit card issuer may complete the transaction request.

5. The method according to claim 1, wherein the risk data is correlated to the transaction request.

6. The method according to claim 5, wherein the risk data comprises correlating a dollar amount associated with the transaction request with risk data related to risk-prone dollar amount requests.

7. The method according to claim 1, wherein the at least one fraudulent activity database comprises a malicious device database.

8. The method according to claim 1, wherein the at least one fraudulent activity database comprises a risk data database.

9. A system for facilitating a transaction involving a digital wallet application, the system comprising:
    a receiver to receive a transaction request from a user device associated with a digital wallet application; and
    a communication interface to automatically establish a communication between the user device and a malicious device identification engine, wherein the malicious device identification engine is configured to:
    determine a unique device identifier for the user device;
    receive risk data from at least one fraudulent activity database;
    associate the device identifier with risk data and generate a device score based on the risk data;
    determine that the user device is a malicious digital wallet device based on the device score; and
    in response to determining the user device as the malicious digital wallet device, determine that the digital wallet application is turned off or is running in the background on the user device, generate a notification, transmit an activation control signal to the user device to cause the digital wallet application to display the notification relating to the determined malicious digital wallet device and enable connection via a network with a wallet provider, and
    wherein when the user device is determined to be malicious, the user device is added to the at least one fraudulent activity database and when the user device is determined to be non-malicious, completing the transaction request.

10. The system according to claim 9, wherein the unique device identifier is determined based on a hardware component of the user device.

11. The system according to claim 9, wherein the malicious device identification engine is further configured to provision the transaction request by transmitting provisioning data to a credit card network.

12. The system according to claim 11, wherein the malicious device identification engine is further configured to transmit a final payload to a credit card issuer, wherein the credit card issuer may complete the transaction request.

13. The system according to claim 9, wherein the risk data is correlated to the transaction request.

14. The system according to claim 13, wherein the risk data comprises correlating a dollar amount associated with the transaction request with risk data related to risk-prone dollar amount requests.

15. The system according to claim 9, wherein the at least one fraudulent activity database comprises a malicious device database.

16. The system according to claim 9, wherein the at least one fraudulent activity database comprises a risk data database.

17. A non-transitory computer readable medium configured to store instructions for facilitating a transaction involving a digital wallet application, the instructions, when executed cause a processor to perform the following:
    causing a receiving to receive a transaction request from a user device associated with a digital wallet application;
    in response to receiving the transaction request, automatically establishing a communication between the user device and a malicious device identification engine; and
    causing the malicious device identification engine to:
    determine a unique device identifier for the user device;
    receive risk data from at least one fraudulent activity database;
    associate the device identifier with risk data and generate a device score based on the risk data;
    determine that the user device is a malicious digital wallet device based on the device score; and
    in response to determining the user device as the malicious digital wallet device, determine that the digital wallet application is turned off or is running in the background on the user device, generate a notification, transmit an activation control signal to the user device to cause the digital wallet application to display the notification relating to the determined malicious digital wallet device and enable connection via a network with a wallet provider, and
    wherein when the user device is determined to be malicious, the user device is added to the at least one fraudulent activity database and when the user device is determined to be non-malicious, completing the transaction request.

18. The non-transitory computer readable medium according to claim 17, wherein the unique device identifier is determined based on a hardware component of the user device.

19. The non-transitory computer readable medium according to claim 17, wherein the instructions, when executed, further cause the malicious device identification engine to provision the transaction request by transmitting provisioning data to a credit card network.

20. The non-transitory computer readable medium according to claim 19, wherein the instructions, when executed, further cause the malicious device identification engine to transmit a final payload to a credit card issuer, wherein the credit card issuer may complete the transaction request.

* * * * *